Figure 1:
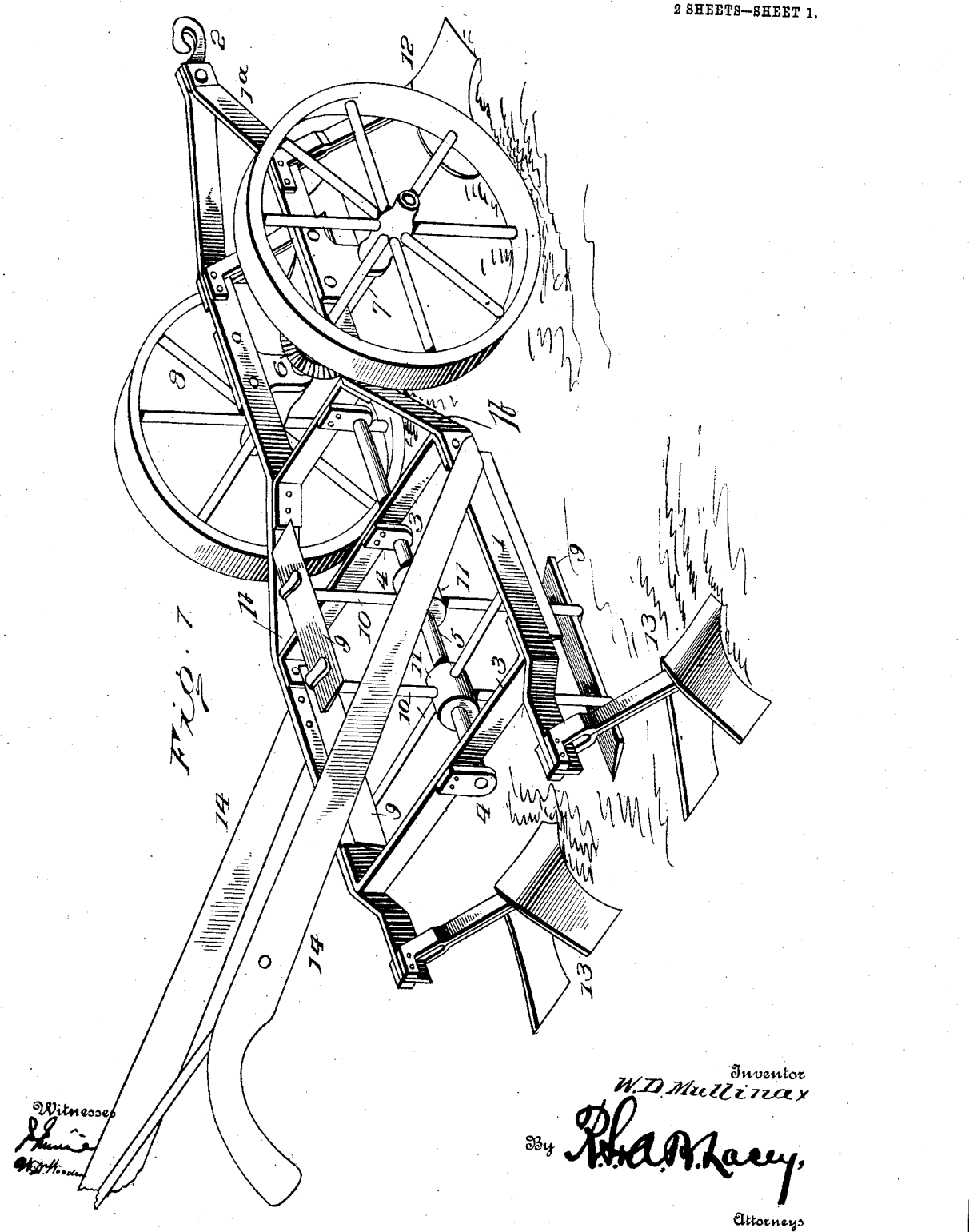

No. 866,800. PATENTED SEPT. 24, 1907.
W. D. MULLINAX.
CULTIVATOR.
APPLICATION FILED JULY 12, 1906.

2 SHEETS—SHEET 1.

Inventor
W. D. Mullinax
By R. A. P. Lacey,
Attorneys

No. 866,800. PATENTED SEPT. 24, 1907.
W. D. MULLINAX.
CULTIVATOR.
APPLICATION FILED JULY 12, 1906.
2 SHEETS—SHEET 2.
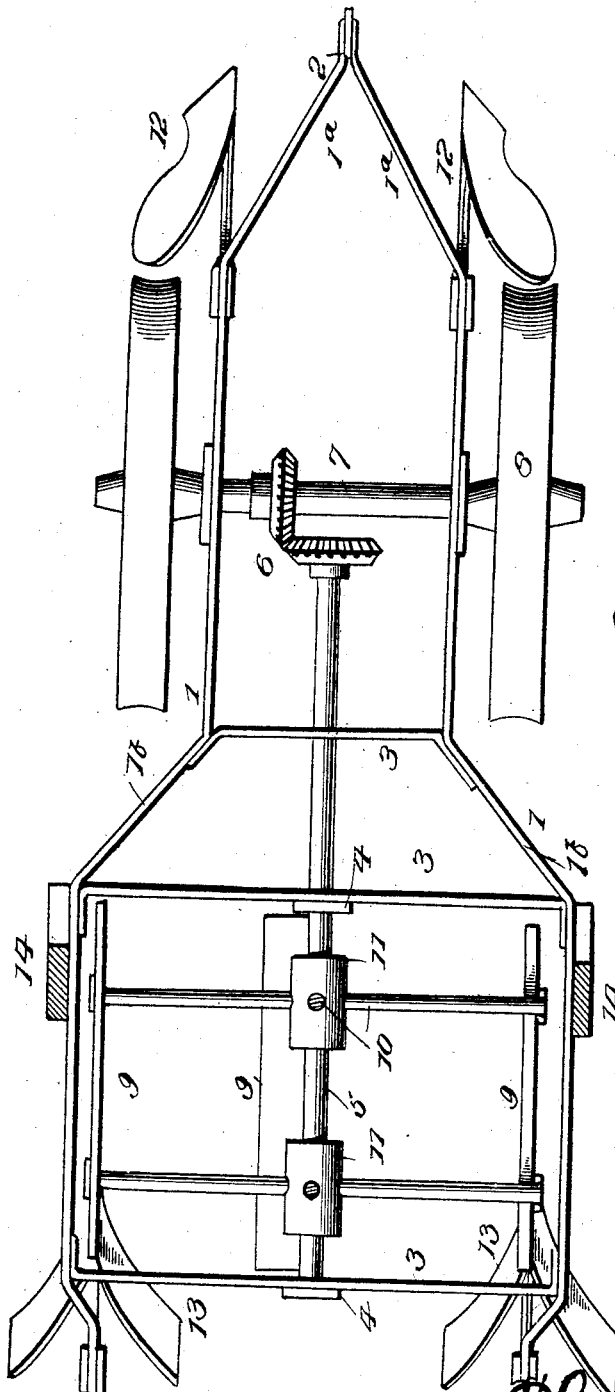

UNITED STATES PATENT OFFICE.

WILKIE D. MULLINAX, OF GORE, GEORGIA.

CULTIVATOR.

No. 866,800.  Specification of Letters Patent.  Patented Sept. 24, 1907.

Application filed July 12, 1906. Serial No. 325,952.

*To all whom it may concern:*

Be it known that I, WILKIE D. MULLINAX, a citizen of the United States, residing at Gore, in the county of Chattooga and State of Georgia, have invented certain new and useful Improvements in Cultivators, of which the following is a specification.

This invention consists of an improved agricultural implement, comprising a cultivator of novel construction.

The essential feature of the invention resides in the detail structure of the framework which is simple, consequently comparatively cheap from the standpoint of manufacture, which is possessed of various advantages as will be readily apparent as the description proceeds, and which is so constructed as to provide an improved support or mounting for a cotton chopper.

For a full understanding of the invention and the merits thereof and also to acquire a knowledge of the details of construction of the means for effecting the result, reference is to be had to the following description and accompanying drawings, in which:

Figure 1 is a perspective view of an implement embodying the invention. Fig. 2 is a top plan view of the same.

Corresponding and like parts are referred to in the following description and indicated in all the views of the drawings by the same reference characters.

In carrying out the invention the implement including the essential features thereof comprises the frame consisting of the sides 1, the forward ends of which converge at 1ª and are joined in a substantial manner by a fastening securing a draft hook or member 2 thereto. The sides 1 diverge at 1ᵇ, intermediate of their ends and toward the rear end of the frame. Transverse bars 3 connect the sides 1 at the rear portions and have bearing brackets 4 applied thereto to receive and support the hoe shaft 5. Intermeshing bevel gears 6 on the front end of shaft 5 and on the axle 7, operatively connect said shaft with the axle so that motion will be imparted to the shaft as the implement advances, traveling on its ground wheels 8 which are of course fixedly mounted on the axle 7.

The hoe shaft 5 carries the hoe or chopper which consists of a plurality of chopping blades 9 attached to the outer ends of arms 10 which extend from hubs or spools 11 secured to the shaft 5. The blades 9 may be of a size and form conducive to getting the desired and best results in so far as the cutting action thereof is concerned, and in order to sever the plants at the proper intervals in the length of the row. Spaced plows 12 are secured to the front ends of the sides 1 of the frame of the chopper and extend downwardly therefrom to operate on opposite sides of the row.

At the rear extremities of the sides 1 are located spaced sweeps 13, one of which is carried by each side and both being suitably secured thereto. Standards are utilized to support both the plows and sweeps. Handles 14 to be grasped by the operator in the customary manner are attached at the lower extremities thereof to the sides 1 of the frame and the operation of the implement will be obvious from the foregoing.

Having thus described the invention, what is claimed as new is:

In a cultivator, the combination of a pair of oppositely disposed side pieces flared apart at an intermediate point, the forward portions of the side pieces being approximately parallel and the rear portions being also approximately parallel and spaced further apart than the forward portions, the front extremities of the side bars being converged inwardly and provided with a draft connection, an axle journaled between the forward parallel portions of the side pieces, supporting wheels carried by the axle, a pair of standards extending downwardly in front of the wheels at the front ends of the forward parallel portions of the side pieces, plows carried by the said standards, standards projecting downwardly from the end portions of the rear parallel portions of the side pieces, sweeps carried by the latter mentioned standards, the said sweeps being spaced further apart than the plows and being disposed out of alinement with the same, and transverse brace rods connecting the rear portions of the side bars.

In testimony whereof I affix my signature in presence of two witnesses.

WILKIE D. MULLINAX. [L. S.]

Witnesses:
R. E. MCWILLIAMS,
T. J. ROSS.